US012693546B2

(12) United States Patent
Seo et al.

(10) Patent No.: US 12,693,546 B2
(45) Date of Patent: Jul. 28, 2026

(54) CAMERA MODULE HAVING BALL MEMBERS BETWEEN INNER SIDES OF FIRST AND SECOND MAGNETS

(71) Applicant: Samsung Electro-Mechanics Co., Ltd., Suwon-si (KR)

(72) Inventors: Bo Sung Seo, Suwon-si (KR); Su Kyeong Kim, Suwon-si (KR); Young Bok Yoon, Suwon-si (KR); Nam Ki Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 298 days.

(21) Appl. No.: 18/541,442

(22) Filed: Dec. 15, 2023

(65) Prior Publication Data

US 2024/0219743 A1 Jul. 4, 2024

(30) Foreign Application Priority Data

Dec. 29, 2022 (KR) ........................ 10-2022-0188114

(51) Int. Cl.
| | |
|---|---|
| *G02B 27/64* | (2006.01) |
| *G03B 5/00* | (2021.01) |
| *G03B 13/36* | (2021.01) |
| *H04N 23/55* | (2023.01) |
| *H04N 23/68* | (2023.01) |

(52) U.S. Cl.
CPC .............. *G02B 27/646* (2013.01); *G03B 5/00* (2013.01); *G03B 13/36* (2013.01); *H04N 23/687* (2023.01); *G03B 2205/0007* (2013.01); *G03B 2205/0015* (2013.01); *G03B 2205/0069* (2013.01); *H04N 23/55* (2023.01)

(58) Field of Classification Search
CPC .......... G02B 27/646; G03B 2205/0015; H04N 23/687
See application file for complete search history.

(56) References Cited

U.S. PATENT DOCUMENTS

| | | | |
|---|---|---|---|
| 2016/0299349 A1* | 10/2016 | Cho | .......................... G03B 5/02 |
| 2017/0261720 A1 | 9/2017 | Kang et al. | |

(Continued)

FOREIGN PATENT DOCUMENTS

| | | |
|---|---|---|
| KR | 10-2009-0063398 A | 6/2009 |
| KR | 10-1495028 B1 | 3/2015 |
| KR | 10-1704498 B1 | 2/2017 |

(Continued)

OTHER PUBLICATIONS

Korean Office Action issued on Feb. 7, 2025 in corresponding Korean Application No. 10-2022-0188114. (7 pages in English and 6 pages in Korean).

*Primary Examiner* — Ryan S Dunning
(74) *Attorney, Agent, or Firm* — NSIP Law

(57) ABSTRACT

A camera module includes a lens module including at least one lens, a housing accommodating the lens module, and a driving magnet including first and second magnets disposed on the lens module at an interval. The lens module is supported by the housing with a ball member interposed therebetween. The ball member includes two ball members disposed between inner sides of the first and second magnets in an optical axis direction. The first and second magnets are both disposed on one surface of the lens module.

11 Claims, 8 Drawing Sheets

(56)  References Cited

U.S. PATENT DOCUMENTS

2021/0173223  A1      6/2021  Seo et al.
2025/0147335  A1*    5/2025  Seo ......................... G02B 7/08

FOREIGN PATENT DOCUMENTS

| KR | 10-2021-0073324 | A | 6/2021 | |
| KR | 10-2022-0034612 | A | 3/2022 | |
| KR | 102400516 | B1 * | 5/2022 | ............ G03B 13/36 |
| KR | 10-2427383 | B1 | 8/2022 | |

* cited by examiner

1000

Z
X
Y

A
A'

A-A'

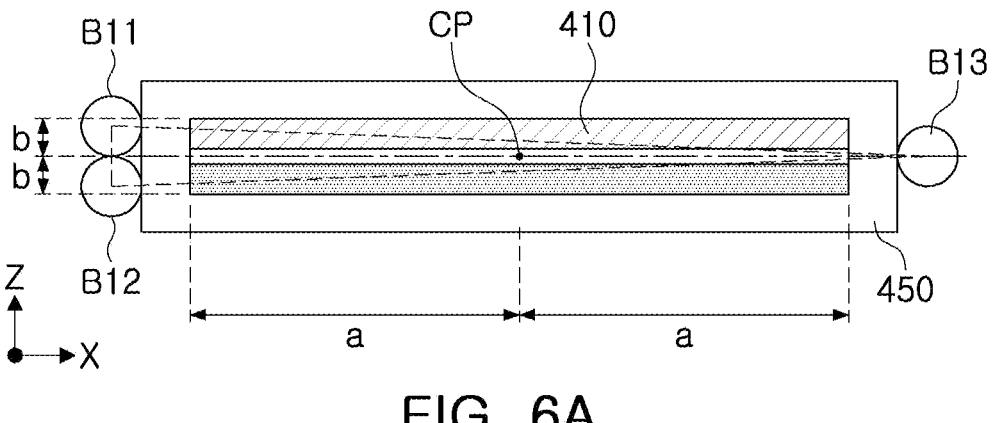
FIG. 6A
FIG. 6B
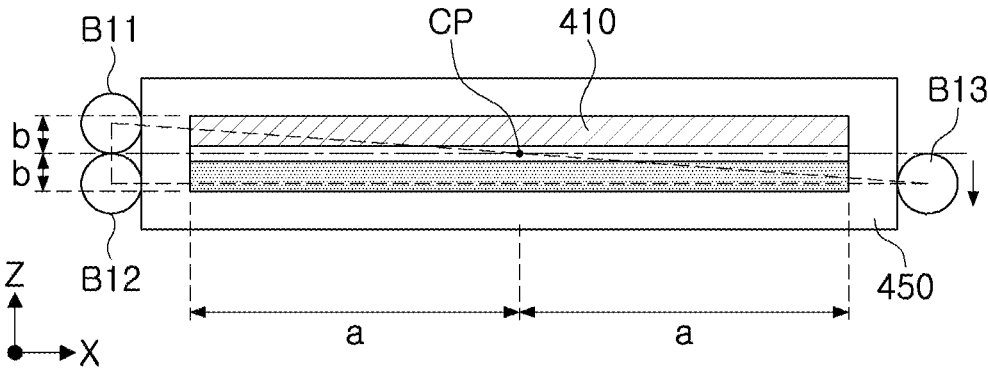
FIG. 6C

CAMERA MODULE HAVING BALL MEMBERS BETWEEN INNER SIDES OF FIRST AND SECOND MAGNETS

CROSS-REFERENCE TO RELATED APPLICATIONS

This application claims the benefit under 35 USC 119(a) of Korean Patent Application No. 10-2022-0188114 filed on Dec. 29, 2022, in the Korean Intellectual Property Office, the entire disclosure of which is incorporated herein by reference for all purposes.

BACKGROUND

1. Field

The present disclosure relates to a camera module.

2. Description of the Background

Camera modules may be used in mobile communication terminals such as smartphones, tablet PCs, and laptop computers.

A focus adjustment function and a shake compensation function may be used in such a camera module to generate a high-resolution image.

Mobile communication terminals and camera modules may be reduced in size. However, an actuator for moving a lens in the optical axis direction is required to implement the focus adjustment function, and it may be difficult to reduce a size of a camera module due to the actuator.

In addition, when a ball bearing is used to guide a motion of the lens, it may be difficult to maintain a balance since the ball bearing is generally configured to be in point contact with another member and a position of the ball bearing is changed by the ball bearing moving in a rolling motion in the process of moving the lens in the optical axis direction. In addition, members being supported, with a ball member inserted therebetween by magnetic force, may be vulnerable to deformation (denting) by external impacts.

In addition, even though the camera module may tend to be reduced in size, a sufficient distance between the centers of the ball members in the optical axis direction needs to be secured to prevent tilting, such that an increase in thickness may be inevitable.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module including at least one lens, a housing accommodating the lens module, and a driving magnet including first and second magnets disposed on the lens module at an interval. The lens module is supported by the housing with a ball member interposed therebetween. The ball member includes two ball members disposed between inner sides of the first and second magnets in an optical axis direction. The first and second magnets are both disposed on one surface of the lens module.

The ball member may further include one ball member disposed on an outer side of the first or second magnet, and three ball members of the ball member may be disposed in a triangular shape.

The camera module may further include a yoke disposed to oppose the driving magnet in a direction perpendicular to the optical axis direction, wherein a center of attractive force formed between the driving magnet and the yoke may be formed inside a triangle formed by the three ball members.

The camera module may further include a yoke disposed to oppose the driving magnet in a direction perpendicular to the optical axis direction, wherein at least a portion of the yoke may be disposed to overlap the entire first and second magnets of the driving magnet in a direction perpendicular to the optical axis direction.

The ball member may further include at least one ball member disposed on an outer side of the first or second magnet.

Contact points between the ball members and the lens module or the housing may form at least three support points, respectively, and two ball members disposed between the first and second magnets, among the ball members, may always form a support point.

The lens module may have a first accommodation groove having a length in the optical axis direction to accommodate the two ball members between the first and second magnets.

The housing may have a second accommodation groove at a position corresponding to that of the first accommodation groove.

The ball members may be movable in a rolling motion.

The ball member may be fixed to the lens module or the housing to be movable in a sliding motion.

Two driving coils may be disposed to oppose the first and second magnets, respectively.

In another general aspect, a camera module includes a housing having a driving coil, a carrier having a driving magnet to oppose the driving coil, the carrier disposed in the housing to be movable in an optical axis direction, and a yoke disposed on a rear surface of the driving coil to overlap the driving magnet in a direction perpendicular to the optical axis direction. The carrier is supported by the housing via a support protrusion. The driving magnet includes first and second magnets disposed as two magnets spaced from each other at a predetermined interval in a direction perpendicular to the optical axis direction. The support protrusion includes two support protrusions spaced apart from each other in the optical axis direction in point contact with a counter member between inner sides of the first and second magnets, or includes a single support protrusion in the form of a rail in line contact with the counter member. The first and second magnets are both disposed on one surface of the lens module.

The support protrusion may be disposed on the carrier or the housing.

The two support protrusions may be disposed at an upper end and a lower end of the carrier in the optical axis direction, when the support protrusion is disposed on the carrier to be in point contact.

The support protrusion may include at least one support protrusion disposed on an outer side of the first or second magnet.

When the support protrusion may be disposed in point contact between the inner sides of the first and second magnets, contact points with the carrier or the housing respectively form at least three support points, and two support protrusions disposed between the first and second magnets, among the support protrusions, always form a point contact.

The support protrusion may have a hemispherical shape.

The support protrusion may have a semi-cylindrical shape having a length in the optical axis direction.

In another general aspect, a camera module includes a lens module including at least one lens, a housing accommodating the lens module, first and second magnets disposed on the lens module at an interval, and first and second ball bearing groups disposed between the lens module and the housing. A length of the first ball bearing group in the optical axis direction is different from that of the second ball bearing group in the optical axis direction, and the first ball bearing group is disposed between the first and second magnets.

In another general aspect, a camera module includes a lens module having at least one lens, a housing accommodating the lens module, a first magnet and a second magnet disposed on a side surface of the lens module and spaced apart from each other in a first axis direction perpendicular to an optical axis, and a first ball bearing group and a second ball bearing group disposed between the lens module and the housing, and spaced apart from each other in the first axial direction, wherein the first ball bearing group includes two or more balls disposed in an optical axis direction, and the second ball bearing group includes less balls than the first ball bearing group, and wherein the first ball bearing group is disposed between the first magnet and the second magnet.

Other features and aspects will be apparent from the following detailed description, the drawings, and the claims.

BRIEF DESCRIPTION OF DRAWINGS

FIGS. 6A, 6B, and 6C are reference views illustrating an effect of an example embodiment of the present disclosure.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
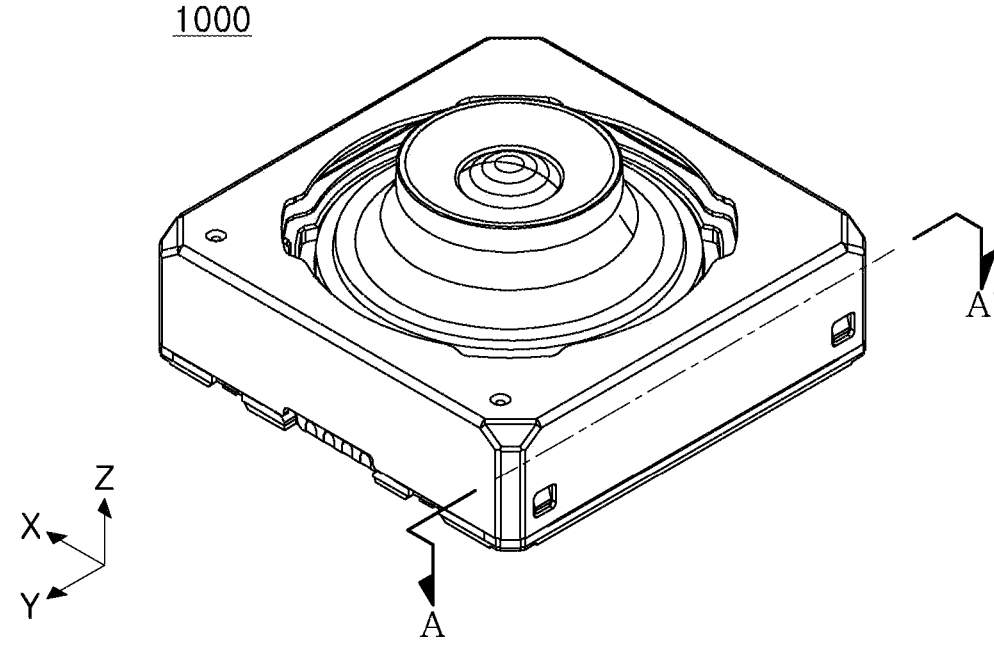
FIG. 1 is a perspective view of a camera module according to an example embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more examples of the present disclosure as described herein may implement stable driving of an actuator for autofocus adjustment while reducing a size of a camera module.

One or more examples of the present disclosure as described herein may ensure sufficient strength against external impacts while reducing a size of a camera module.

The present disclosure relates to a camera module, and may be applicable to portable electronic devices such as mobile communication terminals, smartphones, and tablet PCs including one or more camera modules.

Figure 2:
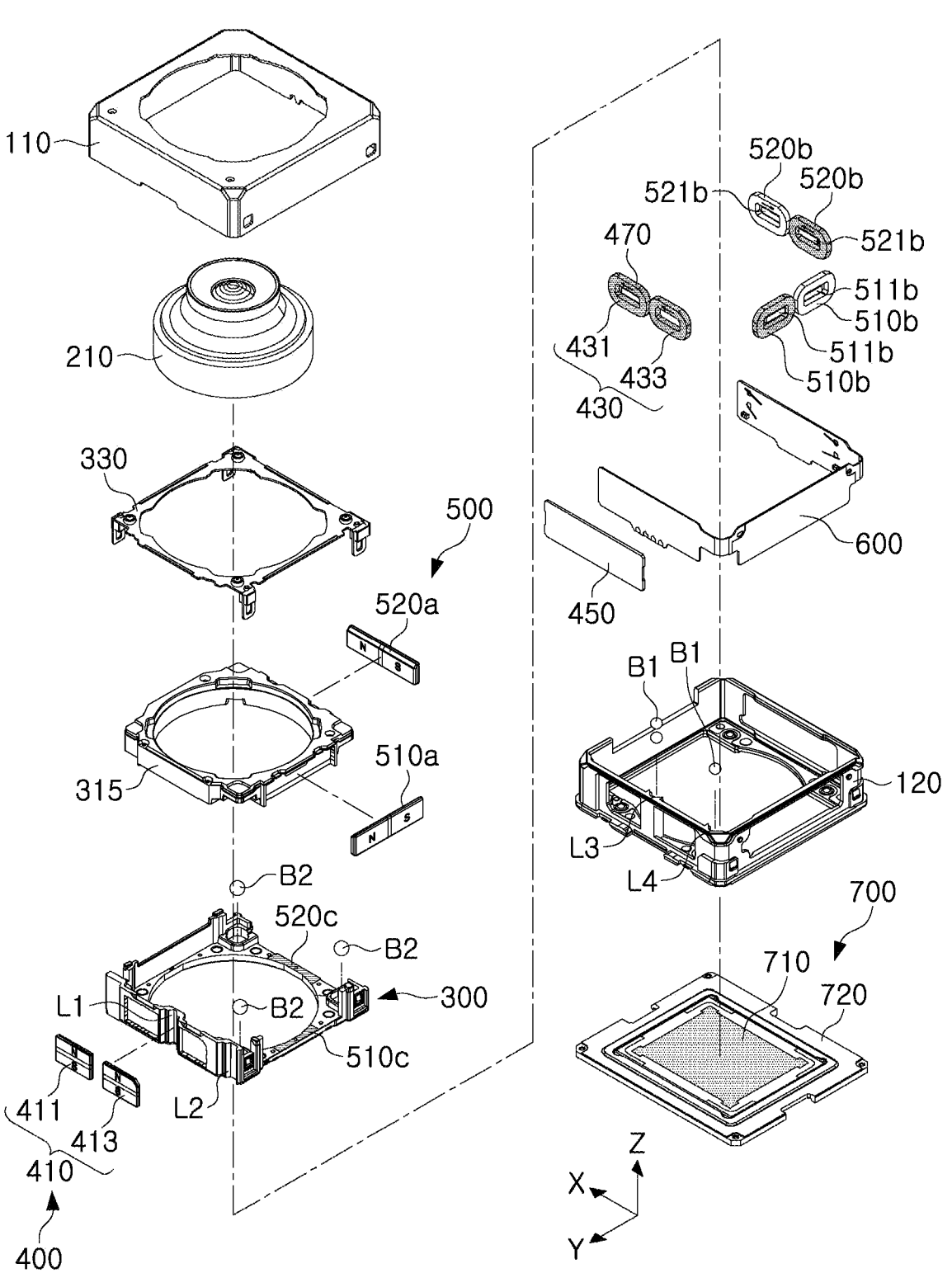
FIG. 2 is a schematic exploded perspective view of a camera module according to an example embodiment of the present disclosure.

FIG. 1 is a perspective view of a camera module according to an example embodiment of the present disclosure, and FIG. 2 is a schematic exploded perspective view of a camera module according to an example embodiment of the present disclosure.

Referring to FIGS. 1 and 2, a camera module 1000 according to an example embodiment of the present disclosure may include a lens barrel 210, a lens driving apparatus for moving the lens barrel 210, an image sensor module 700 converting light incident through the lens barrel 210 into an electrical signal, and a housing 120 and a case 110 accommodating the lens barrel 210 and the lens driving apparatus.

The lens barrel 210 may have a hollow cylindrical shape such that a plurality of lenses for capturing an image of a subject are accommodated therein, and the plurality of lenses may be mounted in the lens barrel 210 along an optical axis.

The necessary number of plurality of lenses may vary depending on a design of the lens barrel 210, and the respective lenses may have optical properties such as the same refractive index, different refractive indices, or the like.

The lens driving apparatus may be an apparatus moving the lens barrel 210.

For example, the lens driving apparatus may perform focus adjustment by moving the lens barrel 210 in an optical axis (Z-axis) direction, and may compensate for the shaking of a camera module during image capturing by moving the lens barrel 210 in directions (X-axis and Y-axis), perpendicular to an optical axis (Z-axis).

The lens driving apparatus may include a focus adjustment unit 400 performing focus adjustment and a shake compensation unit 500 compensating for the shaking of the camera.

The image sensor module 700 may be an apparatus converting light incident through the lens barrel 210 into an electrical signal.

For example, the image sensor module 700 may include an image sensor 710 and a printed circuit board 720 connected to the image sensor 710, and may further include an infrared filter.

The infrared filter may serve to block light in an infrared region in the light incident through the lens barrel 210.

The image sensor 710 may convert the light incident through the lens barrel 210 into an electrical signal. For example, the image sensor 710 may be a charge coupled device (CCD) or a complementary metal-oxide semiconductor (CMOS).

The electrical signal converted by the image sensor 710 may be output as an image through a display unit of a portable electronic device.

The image sensor 710 may be fixed to the printed circuit board 720, and may be electrically connected to the printed circuit board 720 by wire bonding.

The lens barrel 210 and the lens driving apparatus may be accommodated in the housing 120.

For example, the housing 120 may have open upper and lower portions, and the lens barrel 210 and the lens driving apparatus may be accommodated in an internal space of the housing 120.

The image sensor module 700 may be disposed below the housing 120.

In addition, a substrate 600, providing a driving signal to the focus adjustment unit 400 and the shake compensation unit 500, may be disposed on a side surface of the housing 120. The substrate 600 may be provided as a single substrate 600 surrounding the side surface of the housing 120.

As will be described below, the side surface of the housing 120 may have an opening, such that a driving coil 430 of the focus adjustment unit 400, and a first driving coil 510b, a second driving coil 520b, and second position detection units 511b and 521b of the shake compensation unit 500 may be inserted thereinto.

The case 110 may be coupled to the housing 120, and may serve to protect internal components of the camera module 100.

In addition, the case 110 may serve to shield electromagnetic waves.

For example, the case 110 may shield electromagnetic waves such that the electromagnetic waves generated in the camera module do not affect other electronic components in the portable electronic device.

In addition, various electronic components in addition to the camera module may be mounted in the portable electronic device, such that the case 110 may shield electromagnetic waves such that electromagnetic waves generated in the electronic components may not affect the camera module.

The case 110 may be formed of a metal material to thereby be grounded to a ground pad provided in the printed circuit board 720, thereby shielding electromagnetic waves.

Referring to FIG. 2, the focus adjustment unit 400 of the lens driving apparatus of the camera module 1000 according to an example embodiment of the present disclosure will be described.

In order to focus on a subject, the lens barrel 210 may be moved by the lens driving apparatus.

For example, in the present disclosure, the focus adjustment unit 400, moving the lens barrel 210 in the optical axis (Z-axis) direction, may be included.

The focus adjustment unit 400 may include a carrier 300 accommodating the lens barrel 210, and magnets 410, 411, and 413 and driving coils 430, 431, and 433 generating driving force so as to move the lens barrel 210 and the carrier 300 in the optical axis (Z-axis) direction. Here, the carrier 300 accommodating the lens barrel 210, the focus adjustment unit 400, may be included in a lens module. That is, the carrier 300 and all components provided in the carrier 300 may be included in the lens module.

The magnet 410 may be mounted on the carrier 300. For example, the magnet 410 may be mounted on one surface of the carrier 300.

The driving coil 430 may be a copper foil pattern in which winding coils are attached to the substrate 600 or are stacked and embedded in the substrate 600. The substrate 600 may be mounted on a side surface of the housing 120 such that the magnet 410 and the driving coil 430 oppose each other in a direction perpendicular to the optical axis (Z-axis).

The magnet 410 may be a moving member mounted on the carrier 300 to move together with the carrier 300 in the optical axis (Z-axis) direction, and the driving coil 430 may be a fixed member fixed to the housing 120.

When power is applied to the driving coil 430, the carrier 300 may be moved in the optical axis (Z-axis) direction by electromagnetic interaction between the magnet 410 and the driving coil 430.

Figure 11:
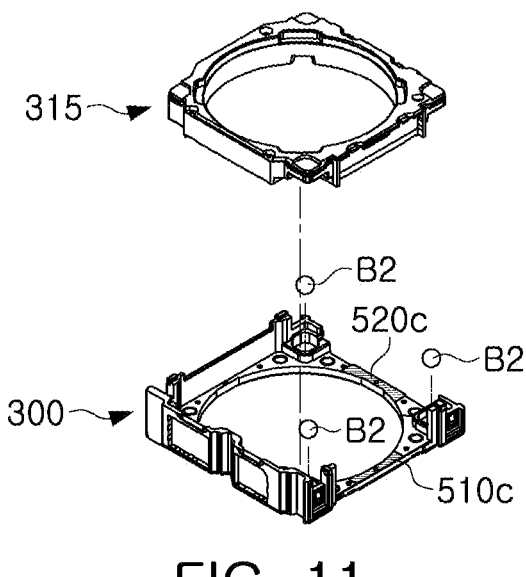
FIG. 11 is an exploded perspective view of a guide member according to an example embodiment of the present disclosure.

Referring to FIGS. 2 and 11, a guide member 315 may be accommodated in the carrier 300 to implement shake compensation, and the lens barrel 210 may be mounted in the guide member 315, such that the guide member 315 and the lens barrel 210 may also be moved in the optical axis (Z-axis) direction by the movement of the carrier 300. In this case, the guide member 315 may move in both X-axis and Y-axis directions, perpendicular to the optical axis direction.

Figure 12:
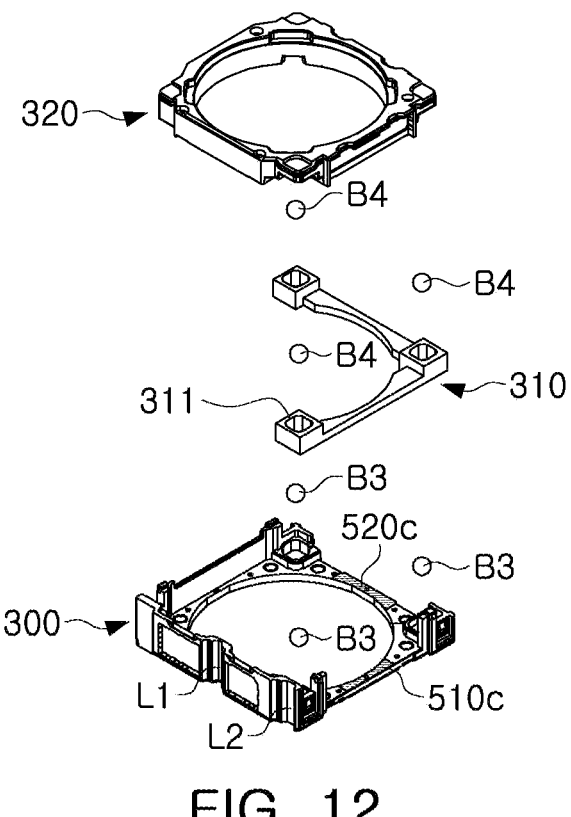
FIG. 12 is an exploded perspective view of a guide member according to another example embodiment of the present disclosure.

Referring to FIGS. 2 and 12 as another example embodiment, the guide member 315 may be provided as a separation-type guide member. That is, the guide member 315 including a frame 310 and a lens holder 320 may be accommodated in the carrier 300, and the lens barrel 210 may be mounted in the lens holder 320. In this case, the frame 310, the lens holder 320, and the lens barrel 210 may be moved in the optical axis (Z-axis) direction by the movement of the carrier 300.

When the carrier 300, that is, the lens module, is moved, ball members B1 to B11, B12, and B13 may be disposed between the carrier 300 and the housing 120 to reduce friction between the carrier 300 and the housing 120. The ball member B1 may be in the form of a ball.

The magnet 410 may be divided into two magnets 411 and 413, and the two magnets 411 and 413 may be disposed to be spaced from each other at a predetermined interval in a direction (X-axis direction in the drawing), perpendicular to the optical axis direction. Here, the two magnets 411 and 413 may be provided together on one surface of the carrier 300, that is, the lens module. That is, the two magnets 411 and 413 may be provided on one surface of the lens module. In addition, the driving coil 430 may be divided into two driving coils 431 and 433, and the two driving coils 431 and 433 may be provided in the housing 120 to respectively oppose the two driving magnets 411 and 413.

The ball member B1 may include an eleventh ball member B11 and a twelfth ball member B12 disposed between inner sides of the two driving magnets 411 and 413. An auxiliary ball member may also be additionally provided between the eleventh ball member B11 and the twelfth ball member B12 or on outer sides of the eleventh ball member B11 and the twelfth ball member B12. The auxiliary ball member may have a size the same as or smaller than those of the eleventh ball member B11 and the twelfth ball member B12.

In addition, a thirteenth ball member B13 provided on an outer side of one of the two driving magnets 411 and 413 may be included. An auxiliary ball member may also be additionally provided on an upper portion or lower portion of the thirteenth ball member B13 in the optical axis direction. The auxiliary ball member may have a size the same as or smaller than the thirteenth ball member B13.

The ball member B1 may include at least three ball members, an eleventh ball member B11, a twelfth ball member B12, and a thirteenth ball member B13, and the three ball members may correspond to vertices of a triangle. That is, the three ball members may form the triangle.

Here, the ball members B11 and B12 provided between the first and second magnets 411 and 413 may be referred to as a first ball bearing group, and other ball members, for example, the ball member B13 provided on an outer side of the first magnet 411 or the second magnet 413, may be referred to as a second ball bearing group. In addition, as described above, an auxiliary ball member may be additionally provided between the eleventh ball member B11 and the twelfth ball member B12 or on the outer sides of the eleventh ball member B11 and the twelfth ball member B12, and the second ball bearing group may include one ball member or two or more ball members.

A length of the first ball bearing group in the optical axis direction may be provided to be different from that of the second ball bearing group in the optical axis direction. For example, as described above, the first ball bearing group may include two ball members B11 and B12, and the second ball bearing group may include one ball member B13 (that is, there is a difference between the number of ball members of the first ball bearing group and the number of ball members of the second ball bearing group), or even when the first ball bearing group and the second ball bearing group include the same number of ball members such as two or three ball members, a sum of diameters of all ball members of the first ball bearing group may be different from a sum of diameters of all ball members of the second ball bearing group.

Contact points between the ball members B11, B12, and B13 and the carrier 300 or the housing 120 may form at least three support points, respectively, and two ball members B11 and B12 provided between the magnets 411 and 413, among the ball members B11, B12, and B13, may always form a support point.

That is, three ball members may be respectively accommodated in a first accommodation groove L1 and a second accommodation groove L2 of the carrier 300, and a third accommodation groove L3 and a fourth accommodation groove L4 of the housing 120.

The first accommodation groove L1 may be provided in the carrier 300 and may be provided between the inner sides of the two driving magnets 411 and 413. In addition, the second accommodation groove L2 may be provided on an outer side of one of the two driving magnets 411 and 413.

Accordingly, the third accommodation groove L3 may be provided in the housing 120 and provided between the inner sides of the two driving coils 431 and 433 to oppose the first accommodation groove L1, and the fourth accommodation groove L4 may be provided on an outer side of one of the two driving coils 431 and 433 to oppose the second accommodation groove L2.

The first to fourth accommodation grooves L1 to L4 may be provided to have a long rail groove shape such that the first to fourth accommodation grooves L1 to L4 have a length in the optical axis direction.

In addition, the eleventh ball member B11 and the twelfth ball member B12 may be inserted between the first accommodation groove L1 and the third accommodation groove L3 to be movable in a rolling motion or sliding motion in the optical axis direction, and the thirteenth ball member B13 may be inserted between the second accommodation groove L2 and the fourth accommodation groove L4 to be movable in a rolling motion or sliding motion in the optical axis direction.

The ball member B1 may be a structure fixed to the carrier 300 or the housing 120. In this case, the ball member B1 may slidably move along an accommodation groove provided in a counter member opposing the ball member B1. For example, when the ball member B1 is fixed to the carrier 300, the housing 120 may be the counter member, and when the ball member B1 is fixed to the housing 120, the carrier 300 may be the counter member.

A first yoke 450 may be disposed to oppose the magnet 410 in a direction (Y-axis) perpendicular to the optical axis (Z-axis). For example, the first yoke 450 may be mounted on an outer side surface of the substrate 600 (a surface opposite to a surface on which the driving coil 430 is provided). Accordingly, the first yoke 450 may be disposed to oppose the magnet 410 with the driving coil 430 interposed therebetween. That is, the first yoke 450 may be disposed to overlap at least a portion of the magnet 410 in a direction (Y-axis direction) perpendicular to the optical axis direction.

Attractive force may act between the first yoke 450 and the magnet 410 in a direction perpendicular to the optical axis (Z-axis).

Accordingly, the ball member B1 may maintain a state of contact with the carrier 300 and the housing 120 due to the attractive force between the first yoke 450 and the magnet 410.

In addition, the first yoke 450 may also server to focus magnetic force of the magnet 410, thereby preventing leakage magnetic flux from occurring.

For example, the first yoke 450 and the magnet 410 may form a magnetic circuit.

In the present example embodiment, the magnets 410 may be divided into two magnets, and the first yoke 450 may be provided to overlap at least a portion of the two magnets 411 and 413 in a direction perpendicular to the optical axis direction. For example, the first yoke 450 may be provided to have a larger size so as to overlap all of the two magnets 411 and 413.

In the present disclosure, a closed loop control method of detecting a position of the lens barrel 210 and providing feedback related thereto may be used.

Accordingly, a first position detection unit 470 may be provided for closed loop control. The first position detection unit 470 may use various sensing methods such as an inductance sensing method using at least one coil, a hall sensor sensing method, and the like.

Subsequently, the shake compensation unit 500 of the lens driving apparatus of the camera module 1000 according to an example embodiment of the present disclosure will be described with reference to FIGS. 2, 11, and 12.

The shake compensation unit 500 may be used to compensate for image blurring or image distortion due to an external vibration factor such as the shaking of a user's hand when the image is captured or the video is recorded.

For example, when the camera module is shaken during image capturing due to the shaking of the user's hand or the like, the shake compensation unit 500 may impart relative displacement corresponding to the shaking of the camera to the lens barrel 210, thereby compensating for the shaking of the camera.

For example, the shake compensation unit 500 may compensate for the shaking of the camera module by moving the lens barrel 210 in a direction perpendicular to the optical axis (Z-axis).

The shake compensation unit 500 may include a guide member 315 guiding the movement of the lens barrel 210, and a plurality of magnets and a plurality of coils generating driving force to move the guide member 315 in a direction perpendicular to the optical axis (Z-axis).

The plurality of magnets may include a first magnet 510a and a second magnet 520a, and the plurality of coils may include a first driving coil 510b and a second driving coil 520b.

Referring to FIGS. 2 and 11, the guide member 315 may be inserted into the carrier 300 and may serve to guide the movement of the lens barrel 210 mounted in the guide member 315. The guide member 315 has a space into which the lens barrel 210 is insertable. The lens barrel 210 may be inserted into and fixed to the guide member 315. The guide member 315 may be provided as a single member, and thus may be provided to move in a first direction perpendicular to the optical axis direction, and a second direction perpendicular to both the optical axis direction and the first direction.

In addition, referring to FIG. 12, the guide member 315 may include the frame 310 and the lens holder 320. The frame 310 and the lens holder 320 may be sequentially inserted into the carrier 300 in the optical axis (Z-axis) direction, and may serve to guide the movement of the lens barrel 210. In this case, the frame 310 may serve to guide the movement in the first direction perpendicular to the optical axis direction, and the lens holder 320 may serve to guide the movement in the second direction perpendicular to both the optical axis direction and the first direction.

The frame 310 and the lens holder 320 have a space into which the lens barrel 210 is insertable. The lens barrel 210 may be inserted into and fixed to the lens holder 320.

The guide member 315 disposed on an upper portion of the carrier 300 in the optical axis direction with the ball member B2 interposed therebetween may move in the first and second directions. To this end, the guide member 315 may include a first magnet 510a and a second magnet 520a disposed on mutually perpendicular surfaces thereof to be parallel to the optical axis direction.

The guide member 315 may be moved in a direction perpendicular to the optical axis (Z-axis), with respect to the carrier 300 by driving force generated by a plurality of magnets and a plurality of coils.

The first magnet 510a and the first driving coil 510b may generate driving force in a first axis (X-axis) direction perpendicular to the optical axis (Z-axis), and the second magnet 520a and the second driving coil 520b may generate driving force in a second axis (Y-axis) direction perpendicular to the first axis (X-axis). That is, the plurality of magnets and the plurality of coils may generate driving force in directions opposing each other.

Here, the second axis (X-axis) may refer to an axis perpendicular to both the optical axis (Z-axis) and the first axis (Y-axis).

The plurality of magnets may be disposed to be orthogonal to each other on a plane, perpendicular to the optical axis (Z-axis), and the plurality of coils may also be disposed to be orthogonal to each other on the plane, perpendicular to the optical axis (Z-axis).

In another example embodiment described with reference to FIG. 12, the guide member 315 may include the frame 310 and the lens holder 320.

The frame 310 and the lens holder 320 may be moved in a direction perpendicular to the optical axis (Z-axis), with respect to the carrier 300 by driving force generated by a plurality of magnets and a plurality of coils.

The first magnet 510a and the first driving coil 510b may generate driving force in a first axis (X-axis) direction perpendicular to the optical axis (Z-axis), and the second magnet 520a and the second driving coil 520b may generate driving force in a second axis (Y-axis) direction perpendicular to the first axis (X-axis). That is, the plurality of magnets and the plurality of coils may generate driving force in directions opposing each other.

Here, the second axis (X-axis) may refer to an axis perpendicular to both the optical axis (Z-axis) and the first axis (Y-axis).

The plurality of magnets may be disposed to be orthogonal to each other on a plane perpendicular to the optical axis (Z-axis), and the plurality of coils may also be disposed to be orthogonal to each other on the plane perpendicular to the optical axis (Z-axis).

The first magnet 510a and the second magnet 520a may be mounted on the lens holder 320. For example, the first magnet 510a and the second magnet 520a may be respectively mounted on side surfaces of the lens holder 320. The side surfaces of the lens holder 320 may include a first surface and a second surface perpendicular to each other, and the first magnet 510a and the second magnet 520a may be disposed on the first surface and the second surface of the lens holder 320.

The first driving coil 510b and the second driving coil 520b may be winding coils mounted on the substrate 600 or may be stacked and embedded copper foil patterns. The substrate 600 may be mounted on a side surface of the housing 120 such that the first magnet 510a and the first driving coil 510b oppose each other in a direction perpendicular to the optical axis (Z-axis), and the second magnet 520a and the second driving coil 520b oppose each other in a direction perpendicular to the optical axis (Z-axis).

The first magnet 510a and the second magnet 520a may be moving members moving together with the guide member 315 in a direction perpendicular to the optical axis (Z-axis), and the first driving coil 510b and the second driving coil 520b may be fixed members fixed to the housing 120.

In the present disclosure, a plurality of ball members, supporting the guide member 315 or the frame 310 and the lens holder 320 of the shake compensation unit 500, may be provided. The plurality of ball members may serve to guide the movement of the guide member 315 or the frame 310 and the lens holder 320, and the lens barrel 210 in a shake compensation process. In addition, the plurality of ball members may also serve to maintain intervals between the carrier 300, the frame 310, and the lens holder 320 or the carrier 315 and the guide member 315.

Referring to FIG. 11, the plurality of ball members may include a second ball member B2. The second ball member B2 may guide the movement of the guide member 315 in the first axis (X-axis) direction and the second axis (Y-axis) direction.

Referring to FIG. 12, the plurality of ball members may include a third ball member B3 and a fourth ball member B4.

The third ball member B3 may guide the movement of the frame 310, the lens holder 320, and the lens barrel 210 in the first axis (X-axis) direction, and the fourth ball member B4 guides the movement of the lens holder 320 and the lens barrel 210 in the second axis (Y-axis) direction.

For example, the third ball member B3 may be movable in a rolling motion in the first axis (X-axis) direction when driving force is generated in the first axis (X-axis) direction. Accordingly, the third ball member B3 may guide the movement of the frame 310, the lens holder 320, and the lens barrel 210 in the first axis (X-axis) direction.

In addition, the fourth ball member B4 may be movable in a rolling motion in the second axis (Y-axis) direction when driving force is generated in the second axis (Y-axis) direction. Accordingly, the fourth ball member B4 may guide the movement of the lens holder 320 and the lens barrel 210 in the second axis (Y-axis) direction.

The third ball member B3 may include a plurality of ball members disposed between the carrier 300 and the frame 310, and the fourth ball member B4 may include a plurality of ball members disposed between the frame 310 and the lens holder 320.

When driving force is generated in the first axis (X-axis) direction, the guide member 315, or the frame 310 and the lens holder 320, and the lens barrel 210 may move together in the first axis (X-axis) direction.

In addition, when driving force is generated in the second axis (Y-axis) direction, the guide member 315 or the lens holder 320, and the lens barrel 210 may move in the second axis (Y-axis) direction.

In the present disclosure, a plurality of yokes 510c and 520c may be provided such that the shake compensation unit 500 and the second to fourth ball members B2, B3, and B4 maintain a state of contact therebetween.

The plurality of yokes 510c and 520c may be fixed to the carrier 300, and may be disposed to oppose the first magnet 510a and the second magnet 520a in the optical axis (Z-axis) direction.

Accordingly, attractive force may be generated between the plurality of yokes 510c and 520c and the first and second magnets 510a and 520a in the optical axis (Z-axis) direction.

The shake compensation unit 500 may be pulled in a direction toward the plurality of yokes 510c and 520c by the attractive force generated between the plurality of yokes 510c and 520c and the first and second magnets 510a and 520a, such that the guide member 315 or the frame 310 and the lens holder 320 of the shake compensation unit 500 may maintain a state of contact with the second or third and fourth ball members B2, or B3 and B4.

The plurality of yokes 510c and 520c may be formed of a material capable of generating attractive force between the first magnet 510a and the second magnet 520a. For example, the plurality of yokes 510c and 520c may be formed of a magnetic material.

In the present disclosure, a closed loop control method of detecting a position of the lens barrel 210 and providing feedback related thereto in a shake compensation process may be used.

Thus, a second position detection unit for closed-loop control may be provided. The second position detection unit may be configured to detect a position of the lens barrel 210 in the first axis (X-axis) direction and the second axis (Y-axis) direction.

The second position detection unit may use an inductance sensing method using at least one coil or may use a hall sensor or the like.

Subsequently, with reference to FIGS. 5A to 5C, a structure in which a center of attractive force formed between the yoke 450 and the driving magnets 411 and 413 included in the focus adjustment unit 400 is implemented according to an example embodiment of the present disclosure will be described.

Figure 5A:
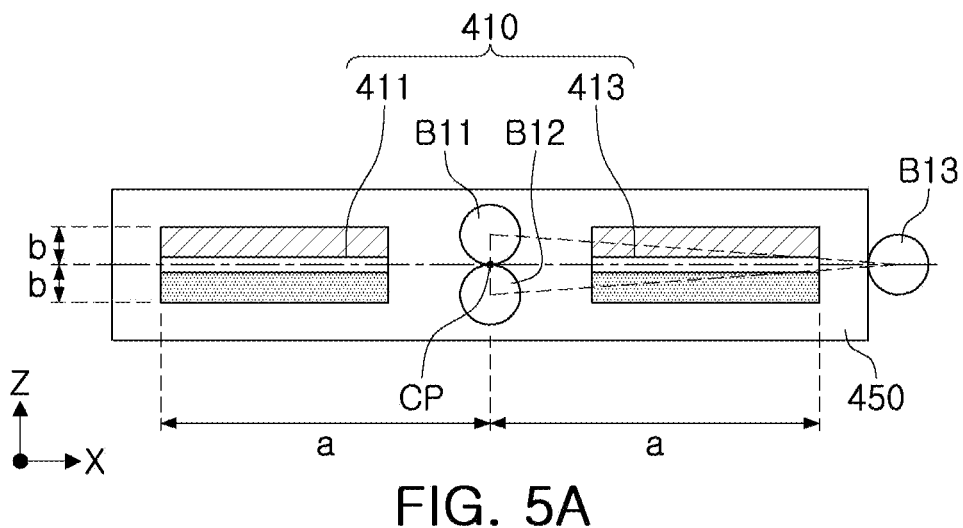
FIGS. 5A, 5B, and 5C are reference views illustrating a position in which a center of attractive force formed between a yoke, a focus driving unit, and a driving magnet is implemented according to an example embodiment of the present disclosure.

Referring to FIG. 5A, the yoke 450 and the driving magnets 411 and 413 may oppose each other in a direction perpendicular to the optical axis direction, and the carrier 300, having the driving magnets 411 and 413, may be supported by the housing 120, having the yoke 450, by attractive power, with the ball members B11, B12, and B13 inserted therebetween.

In the present reference description, an ideal case is assumed in which sufficient attractive force acts between the yoke 450 and the driving magnets 411 and 413, and the two driving magnets 411 and 413 have the same magnetic force and size, and thus the attractive force is equally distributed. In this case, as illustrated in FIG. 5A, a center of attractive force CP may be formed at a physically central portion of the overall frame of the two driving magnets 411 and 413.

Figure 5B:
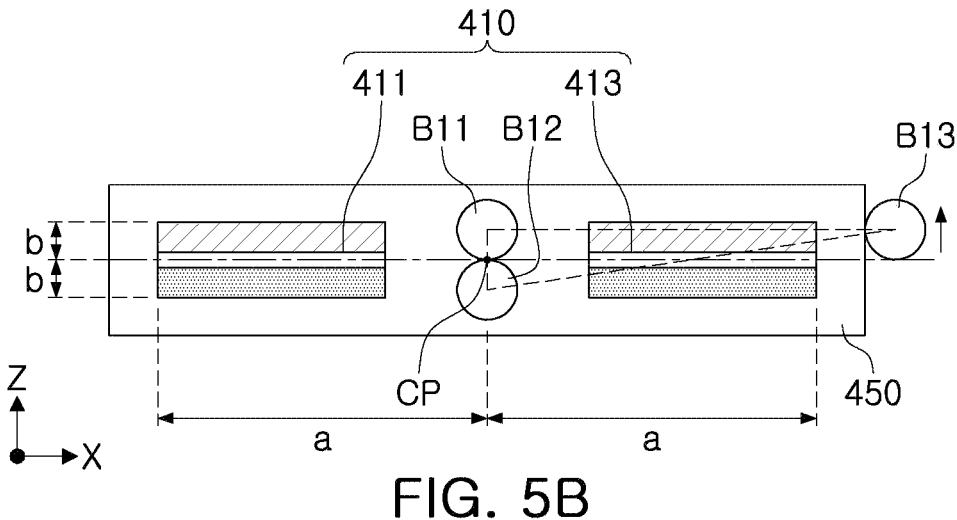
Figure 5C:
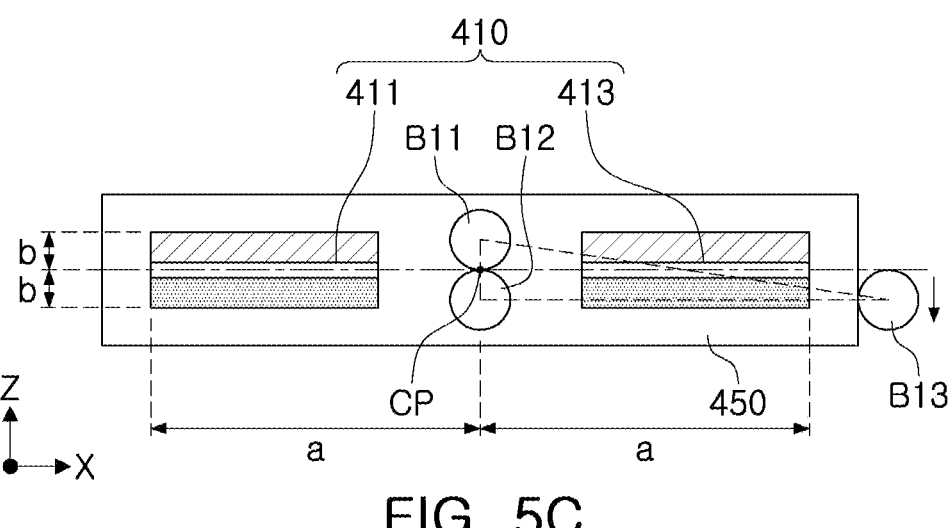

In this case, as illustrated in FIGS. 5A to 5C, even when the ball members B11, B12, and B13 are movable in a rolling motion at any position in the optical axis direction, the center of attractive force CP may be positioned inside a triangle formed by three ball members B11, B12, and B13. Accordingly, the carrier 300 may be driven while being stably supported by the housing 120 without an issue such as tilting by itself or by a certain degree of external force.

However, as illustrated in FIGS. 6A to 6C, when the driving magnet 410 is integrally provided as a single driving magnet, the situation may change (the same reference numerals as those illustrated in FIGS. 5A to 5C are used for ease of description).

That is, even in FIGS. 6A to 6C, assuming an ideal case as described with reference to FIGS. 5A to 5C, the center of attractive CP may be formed at substantially the same position.

However, as illustrated in FIG. 6A, when the three ball members B11, B12, and B13 are aligned approximately in a center of a movement path in the optical axis direction, the center of attractive force CP may be positioned inside the triangle formed by the three ball members B11, B12, and B13. However, as illustrated in FIG. 6B or 6C, when the three ball members B11, B12, and B13 move to upper or lower portions thereof in the optical axis direction, the center of attractive force CP may be easily deviated to the outside of the triangle formed by the three ball members B11, B12, and B13.

Accordingly, in such a structure, there may be a problem in driving the carrier 300 while the carrier 300 is stably supported by the housing 120.

Referring to FIGS. 7 to 10, a camera module according to another example embodiment of the present disclosure is disclosed.

In another example embodiment of the present disclosure, when the ball members B11, B12, and B13 provided between the housing 120 and the carrier 300 in the above-described example embodiment are movable in a rolling motion in the optical axis direction, a center of attractive force may frequently change. Considering the above, instead of the ball member, a support protrusion provided on the carrier 300 or the housing 120, that is, a point contact protrusion and a line contact protrusion are disclosed.

When the point contact protrusion and line contact protrusion are provided on the carrier 300, the carrier 300 may move in the optical axis direction in a state in which the driving magnet, the point contact protrusion, and line contact protrusion are fixed in a fixed position, such that the actual center of attractive force may not change. Accordingly, the carrier 300 may be driven while maintaining a state of being stably supported by the housing 120.

In addition, when the point contact protrusion and the line contact protrusion are provided on the housing 120, the driving magnet may move relative to the point contact protrusion and the line contact protrusion fixed to the housing. However, relative positions of the point contact protrusions and the line contact protrusion may be maintained without being changed, thereby more stably implementing a focus adjustment unit, unlike a case in which the ball member moves in the optical axis direction. Accordingly, the carrier 300 may be driven while maintaining a state of being stably supported by the housing 120.

Figure 3:
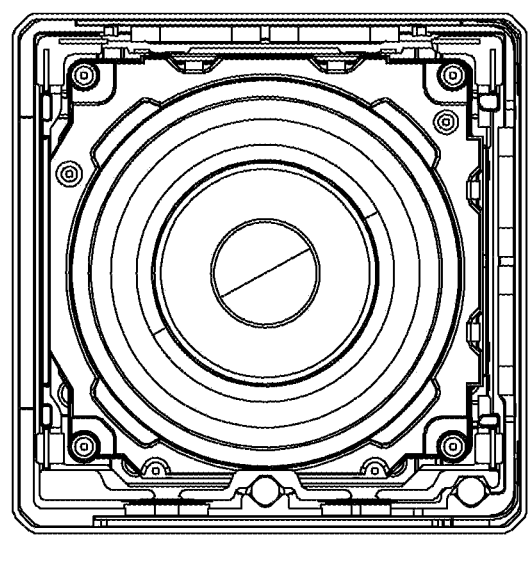
FIG. 3 is a plan cross-sectional view of portion A-A' of FIG. 1.
Figure 4:
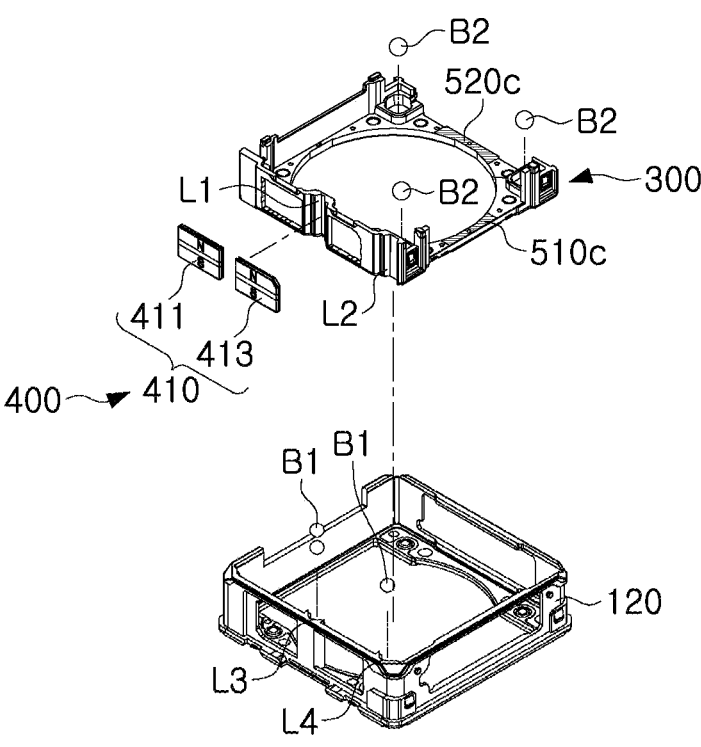
FIG. 4 is an exploded perspective view of a focus driving unit according to an example embodiment of the present disclosure.
Figure 7:
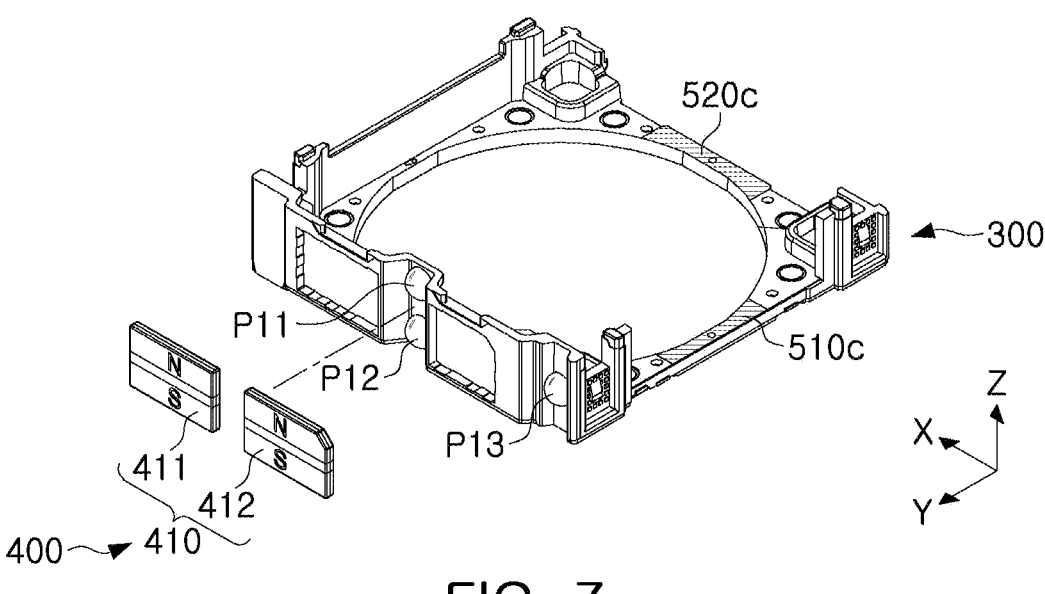
FIGS. 7, 8, 9, and 10 are reference views illustrating a structure of a focus driving unit according to another example embodiment of the present disclosure.

Referring to FIGS. 2, 3, and 7, the camera module according to another example embodiment of the present disclosure may be only different from the camera module according to an example embodiment in that, instead of the ball members B11, B12, and B13 provided between the carrier 300 and the housing 120, the carrier 300 has point contact protrusions P11, P12, and P13, and the point contact protrusions P11, P12 and P13 slidably (frictionally) move along the third accommodation groove L3 and the fourth accommodation groove L4 of the housing 120 while being supported by the housing 120, and may be the same as the camera module according to an example embodiment in terms of other structures. Descriptions of other configurations are omitted, and the same reference numerals as those illustrated in FIG. 2 are used except for changed structures.

When the point contact protrusions P11 and P12 are provided to be in point contact between inner sides of the first and second magnets 411 and 413, in the same manner as the structure described with reference to FIG. 2, contact points P11, P12, and P13 with the carrier 300 or the housing 120 may form at least three support points, respectively, and two support protrusions P11 and P12 provided between the first and second magnets 411 and 413, among the support protrusions P11, P12, and P13, may always form a point contact.

Here, the point contact protrusions P11, P12, and P13 may have a shape having round ends, specifically, a hemispherical shape.

Figure 8:
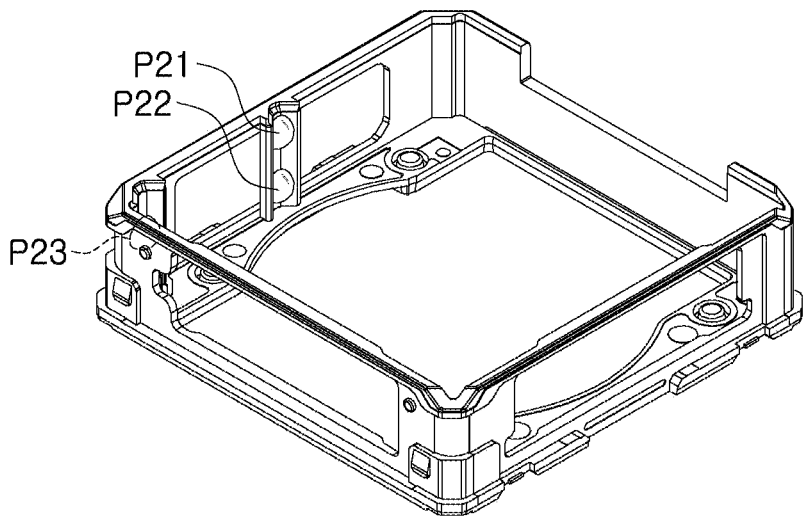

Referring to FIGS. 2, 3, and 8, the camera module according to another example embodiment of the present disclosure may only be different from the camera module according to an example embodiment in that, instead of the ball members B11, B12, and B13 provided between the carrier 300 and the housing 120, the housing 120 has point contact protrusions P21, P22, and P23, and the point contact protrusions P21, P22, and P23 slidably (frictionally) move along the first accommodation groove L1 and the second accommodation groove L2 of the carrier 300 while being supported by the housing 120, and may be the same as the camera module according to an example embodiment in terms of other structures. Descriptions of other configurations are omitted, and the same reference numerals as those illustrated in FIG. 2 are used except for changed structures.

Here, the point contact protrusions P21, P22, and P23 may have a shape having round ends, specifically, a hemispherical shape.

Figure 9:
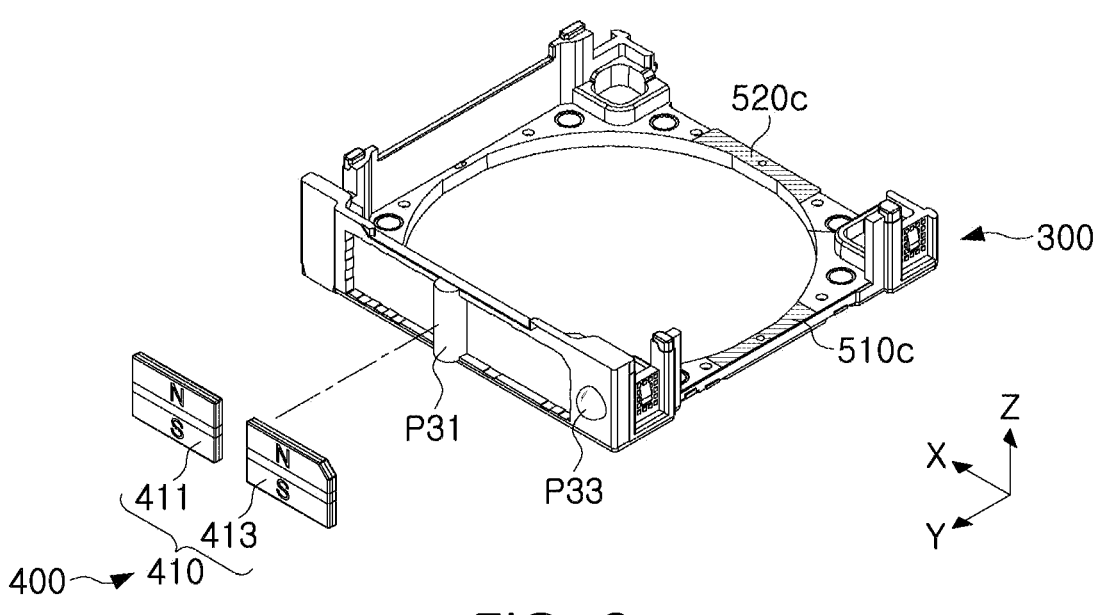

Referring to FIGS. 2, 3, and 9, the camera module according to another example embodiment of the present disclosure may be only different from the camera module according to an example embodiment in that, instead of the ball members B11, B12, and B13 provided between the carrier 300 and the housing 120, the carrier 300 has a line contact protrusion (rail) P31 and a point contact protrusion P33, and the line contact protrusion P31 and the point contact protrusion P33 slidably (frictionally) move along the third accommodation groove L3 and the fourth accommodation groove L4 of the housing 120 while being supported by the housing 120, and may be the same as the camera module according to an example embodiment in terms of other structures. Descriptions of other configurations are omitted, and the same reference numerals as those illustrated in FIG. 2 are used except for changed structures.

Here, the line contact protrusion P31 may have a shape having a round cross section, specifically, a semi-cylindrical shape, and the point contact protrusion P33 may have a shape having a round end, specifically, a hemispherical shape.

Figure 10:
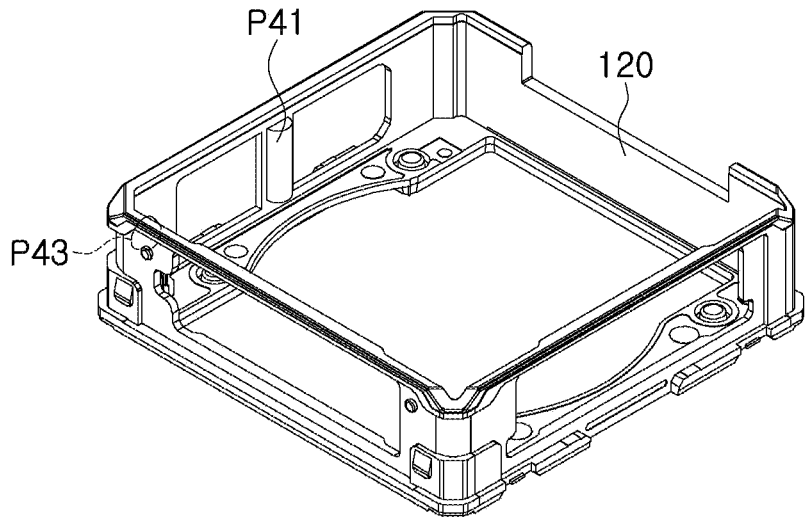

Referring to FIGS. 2, 3, and 10, the camera module according to another example embodiment of the present disclosure may be only different from the camera module according to an example embodiment in that, instead of the ball members B11, B12, and B13 provided between the carrier 300 and the housing 120, the housing 120 has a line contact protrusion P41 and a point contact protrusion P43, and the line contact protrusion P41 and the point contact protrusion P43 slidably (frictionally) move along the first accommodation groove L1 and the second accommodation groove L2 of the carrier 300 while being supported by the housing 120, and may be the same as the camera module according to an example embodiment in terms of other structures. Descriptions of other configurations are omitted, and the same reference numerals as those illustrated in FIG. 2 are used except for changed structures.

Here, the line contact protrusion P41 may have a shape having a round cross section, specifically, a semi-cylindrical shape, and the point contact protrusion P43 may have a shape having a round end, specifically, a hemispherical shape.

Through the above-described example embodiments, the camera module according to an example embodiment of the present disclosure may secure sufficient strength against external impacts while reducing a size thereof.

A camera module according to one or more example embodiments of the present disclosure as described herein may have a reduced size while implementing stable driving of an actuator for autofocus adjustment.

The camera module according to one or more example embodiments of the present disclosure as described herein may have a reduced size while securing sufficient strength against external impact.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens module comprising at least one lens;
a housing accommodating the lens module; and
a driving magnet comprising first and second magnets disposed on the lens module at an interval,
wherein the lens module is supported by the housing with a ball member interposed therebetween,
the ball member includes two ball members disposed between inner sides of the first and second magnets in an optical axis direction, and
the first and second magnets are both disposed on one surface of the lens module.

2. The camera module of claim 1, further comprising:
a yoke disposed to oppose the driving magnet in a direction perpendicular to the optical axis direction,
wherein at least a portion of the yoke is disposed to overlap the entire first and second magnets of the driving magnet in a direction perpendicular to the optical axis direction.

3. The camera module of claim 1, wherein the ball members are movable in a rolling motion.

4. The camera module of claim 1, wherein the ball member is fixed to the lens module or the housing to be movable in a sliding motion.

5. The camera module of claim 1, wherein two driving coils are disposed to oppose the first and second magnets, respectively.

6. The camera module of claim 1, wherein the ball member further includes one ball member disposed on an outer side of the first or second magnet, and three ball members of the ball member are disposed in a triangular shape.

7. The camera module of claim 6, further comprising:
a yoke disposed to oppose the driving magnet in a direction perpendicular to the optical axis direction,
wherein a center of attractive force formed between the driving magnet and the yoke is formed inside a triangle formed by the three ball members.

8. The camera module of claim 1, wherein the ball member further includes at least one ball member disposed on an outer side of the first or second magnet.

9. The camera module of claim 8, wherein
contact points between the ball members and the lens module or the housing form at least three support points, respectively, and
two ball members disposed between the first and second magnets, among the ball members, always form a support point.

10. The camera module of claim 1, wherein the lens module has a first accommodation groove having a length in the optical axis direction to accommodate the two ball members between the first and second magnets.

11. The camera module of claim 10, wherein the housing has a second accommodation groove at a position corresponding to that of the first accommodation groove.

\* \* \* \* \*